(12) United States Patent
Pollard et al.

(10) Patent No.: US 6,631,826 B2
(45) Date of Patent: Oct. 14, 2003

(54) DEVICE TO COUNT AND DISPENSE ARTICLES

(75) Inventors: Jasper Pollard, Durham, NC (US); Richard D. Michelli, Raleigh, NC (US); Charles A. Pell, Durham, NC (US); Ryan Moody, Raleigh, NC (US); Jeff Williams, Hillsborough, NC (US)

(73) Assignee: Parata Systems, LLC, Durham, NC (US)

( * ) Notice: Subject to any disclaimer, the term of this patent is extended or adjusted under 35 U.S.C. 154(b) by 0 days.

(21) Appl. No.: 09/934,940

(22) Filed: Aug. 22, 2001

(65) Prior Publication Data

US 2003/0015555 A1 Jan. 23, 2003

Related U.S. Application Data

(60) Provisional application No. 60/306,782, filed on Jul. 20, 2001.

(51) Int. Cl.[7] .................................................. B23Q 7/12
(52) U.S. Cl. ...................................... 221/156; 221/278
(58) Field of Search ................................. 221/278, 156, 221/163, 211, 233, 264, 7, 13; 406/137, 85

(56) References Cited

U.S. PATENT DOCUMENTS

| 3,722,674 | A | 3/1973  | Hoppmann et al. |
|-----------|---|---------|-----------------|
| 3,730,388 | A | 5/1973  | Bender          |
| 3,789,194 | A | 1/1974  | Kirby           |
| 3,843,018 | A | 10/1974 | Holmes et al.   |
| 3,958,687 | A | 5/1976  | Adams et al.    |
| 4,466,554 | A | 8/1984  | Hanacek et al.  |
| 4,869,394 | A | 9/1989  | Hurst           |
| 4,953,749 | A | 9/1990  | Kubota et al.   |
| 5,082,141 | A | 1/1992  | Martin et al.   |
| 5,317,645 | A | 5/1994  | Perozek et al.  |
| 5,337,919 | A | 8/1994  | Spaulding et al.|
| 5,463,839 | A | 11/1995 | Stange et al.   |
| 5,473,703 | A | 12/1995 | Smith           |
| 5,671,262 | A | 9/1997  | Boyer et al.    |
| 5,713,487 | A | 2/1998  | Coughlin        |
| 5,762,235 | A | 6/1998  | Coughlin        |
| 5,774,518 | A | 6/1998  | Kirby           |
| 6,006,946 | A | 12/1999 | Williams et al. |
| 6,036,812 | A | 3/2000  | Williams et al. |

FOREIGN PATENT DOCUMENTS

| DE | 931 557  |   | 8/1955  |
|----|----------|---|---------|
| DE | 931557   | * | 8/1955  |
| GB | 2244481  |   | 12/1991 |

OTHER PUBLICATIONS

PCT International Search Report PCT/US02/23307.

*Primary Examiner*—Kenneth W. Noland
(74) *Attorney, Agent, or Firm*—Myers Bigel Sibley & Sajovec

(57) ABSTRACT

A singulating and counting device includes a bulk housing for storing a plurality of substantially identical articles, an exit channel, and in the exit channel, forwardly- and rearwardly-directed jet apertures, each of which is fluidly connected to a positive pressure source. A forwardly-directed jet generated by the positive pressure source through the forward jet aperture can accelerate singulated articles in the exit channel, thereby increasing the interval between individual articles and rendering them more easily and accurately counted. A rearwardly-directed jet generated by the positive pressure source through the rearwardly-directed jet aperture can cause articles in the exit channel to return to the housing. A controller operatively connected with the pressure source(s) selectively controls the application of positive pressure to the aforementioned apertures to induce or halt singulation of the articles; the controller may be operatively associated with a sensor that detects and counts articles passing through the exit channel.

29 Claims, 7 Drawing Sheets

U.S. PATENT DOCUMENTS

| | | |
|---|---|---|
| 6,039,512 A | 3/2000 | Chooi et al. |
| 6,053,302 A | 4/2000 | Leu et al. |
| 6,170,229 B1 | 1/2001 | Kim |
| 6,176,392 B1 | 1/2001 | William et al. |
| 6,176,393 B1 | 1/2001 | Luxon |
| 6,182,718 B1 | 2/2001 | Seaton |
| 6,201,848 B1 | 3/2001 | Brancato |
| 6,208,911 B1 | 3/2001 | Yamaoka et al. |
| RE37,829 E | 9/2002 | Charhut et al. |

* cited by examiner

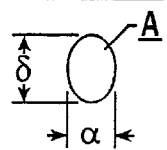
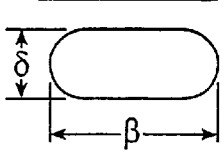
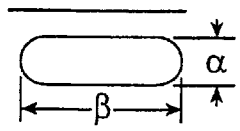
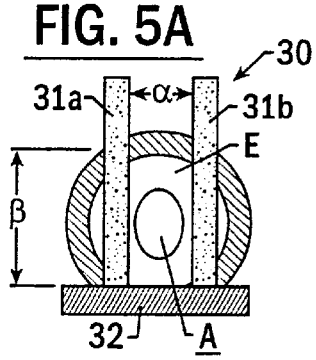
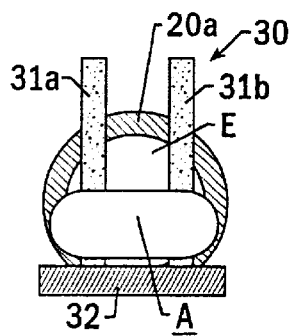
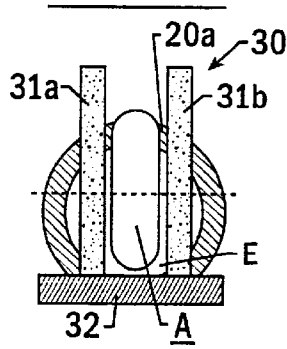
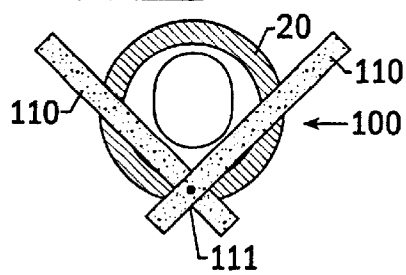
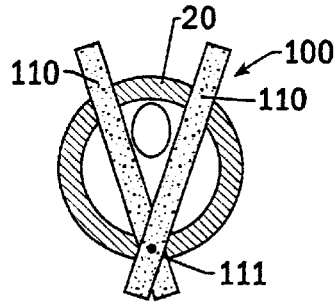
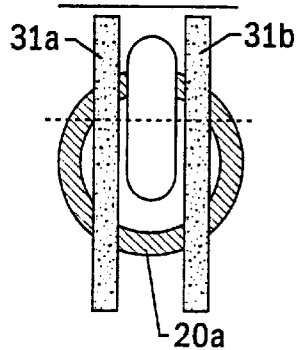
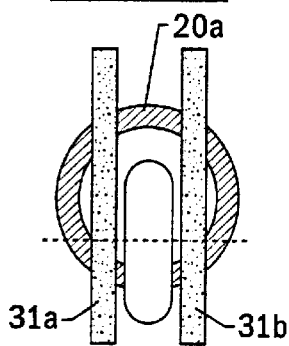

DEVICE TO COUNT AND DISPENSE ARTICLES

CROSS-REFERENCE TO PROVISIONAL APPLICATION

This application claims the benefit of Provisional Application Serial No. 60/306,782, filed Jul. 20, 2001 entitled Device to Count and Dispense Articles, the disclosure of which is hereby incorporated herein by reference in its entirety as if set forth fully herein.

FIELD OF THE INVENTION

This invention is directed generally to the dispensing of objects, and more particularly to dispensing singulated objects.

BACKGROUND OF THE INVENTION

The problem of counting and dispensing a predetermined quantity from a bulk of small articles exists for a multitude of items and processes. Exemplary items include comestibles such as candies and breath mints, machine components such as bolts, nuts and other fasteners, valuables such as diamonds and other gemstones, vitamins, and the like.

The problem has been addressed using multiple approaches. For example, a cavity-filling device sized to physical particulars of a specific article is disclosed in U.S. Pat. No. 3,775,941 to Bross. As another example, a device that counts total weight using a calibrated pieceweight measurement is disclosed in U.S. Pat. No. 4,685,525 to Knothe et al. As an additional example, a device employing a vibratory feeder to singulate (and thus enable counting) is disclosed in U.S. Pat. No. 6,182,718 to Seaton. As yet another example, a device that employs a vacuum to separate and count a fixed, but predetermined number of objects is disclosed in U.S. Pat. No. 6,053,302 to Leu et al. The several devices and techniques exemplified above individually provide varying levels of performance in key operational parameters such as speed, accuracy, universality (adaptability), size, complexity, and cost. But few, if any, provide a high level of measure in more than one or two of the above parameters. Cavity fillers of the type described in Bross are typically bulky and suitable only for articles that closely match the cavity size. Vibratory counters like that disclosed in Seaton are ordinarily bulky and can be difficult to tune (i.e., configure). Weight counters like that described in Knothe can be inaccurate due to piece-weight variability. Vacuum-based systems such as that shown in Leu et al. are typically complex, slow and difficult to calibrate.

In view of the foregoing, a singulating device which is fast, accurate, small, easy to configure, reliable, and nearly universal would be desirable.

SUMMARY OF THE INVENTION

The present invention is directed to devices and methods for rapidly and accurately counting and dispensing a predetermined quantity of articles from a bulk supply of such articles. The devices include a bulk housing for storing a plurality of substantially identical articles and an exit channel. As a first aspect, a device of the present invention also includes, in the exit channel, a forwardly-directed jet aperture and a rearwardly-directed jet aperture, each of which is fluidly connected to a positive pressure source. A forwardly-directed jet generated by the positive pressure source through the forward jet aperture can accelerate singulated articles in the exit channel, thereby increasing the interval between individual articles and rendering them more easily and accurately counted. A rearwardly-directed jet generated by the positive pressure source through the rearwardly-directed jet aperture can cause articles in the exit channel to return to the housing. A controller operatively connected with the pressure source(s) selectively controls the application of positive pressure to the aforementioned apertures to induce or halt singulation of the articles; the controller may be operatively associated with a sensor that detects and counts articles passing through the exit channel.

As a second aspect of the invention, a singulating device having a bulk housing and an exit channel includes a jet aperture positioned across the bulk housing from the exit channel. The jet nozzle is fluidly connected with a positive pressure source, which in turn is connected with a controller that selectively controls the application of positive pressure through the jet aperture. This configuration can produce a jet that urges articles in the housing to travel toward the exit channel.

As a third aspect of the present invention, a singulating device having a bulk housing and an exit channel includes an article-orienting unit that has a pair of panels that, in concert with an upstream portion of the exit channel, define an entry space that permits an oblong or oblate article to enter the exit channel only in a longitudinal orientation in which the longest dimension of the article is generally parallel to a downstream flow path. The upstream ends of the panels extend upstream away from the exit channel and are spaced such that an oblong or oblate article entering the entry space in a transverse orientation in which its longest dimension is generally perpendicular to the downstream flow path that strikes the exit channel's upstream portion and is re-oriented to the longitudinal orientation in which passage through the exit channel is permitted. In one embodiment, the panels are parallel with one another, and the articles are reoriented when striking either exposed edge of the exit channel upstream portion. In a second embodiment, a third panel perpendicular to the first two panels is included, such that the entry space is generally rectangular. In a third embodiment, the panels are hinged to one another and pivot about a pivot axis that is parallel to the direction of flow, such that the entry space (which is adjustable) is generally triangular. In any of these embodiments, the function of the panels is to orient the objects into a desired attitude for entry into the exit channel.

In singulating devices with these aspects of the invention, individual articles can enter the exit channel from the housing and travel through the exit channel in single file and with an interval sufficient to allow accurate detection and precise counting of the articles. The pneumatic, reversible nature of the device can enable the handling of a large range of sizes and shapes with a single device configuration. Furthermore, this same feature allows simple adjustments to be applied to handle an even broader range of sizes. The ability to control the various airflows permits the mechanism to be implemented in a volume not significantly larger than a small portion of the bottom of a bulk storage chamber.

BRIEF DESCRIPTION OF THE DRAWINGS

FIGS. 4A–4C are front, top and side views of an exemplary article to be singulated with the device of FIG. 1.

FIGS. 5A–5C are end section views of the article-orienting unit of the device of FIG. 1 showing how the unit admits passage of a properly longitudinally-oriented article (FIG. 5A), prevents passage of a horizontal, transversely-oriented article (FIG. 5B), and re-orients a vertical, transversely-oriented article for proper entry into the exit channel (FIG. 5C).

FIGS. 6A and 6B are end section views of an alternative embodiment of an article-orienting unit according to the present invention that enables the size of the opening therein to be adjusted.

FIGS. 7A and 7B are end section views of another embodiment of an article-orienting unit according to the present invention.

DETAILED DESCRIPTION OF THE INVENTION

Figure 1:
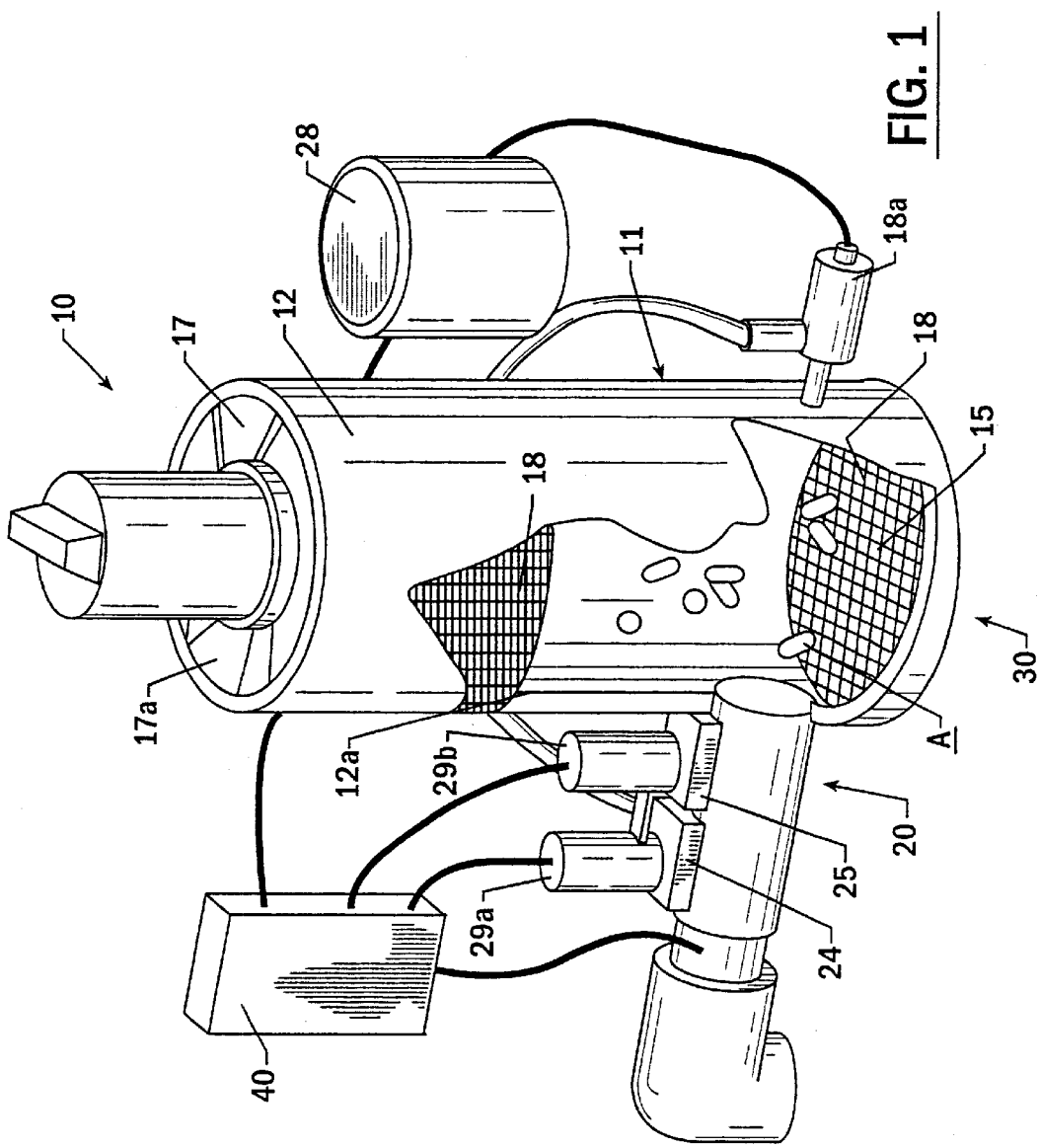
FIG. 1 is a partial cutaway perspective view of the singulating and counting device of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Figure 2:
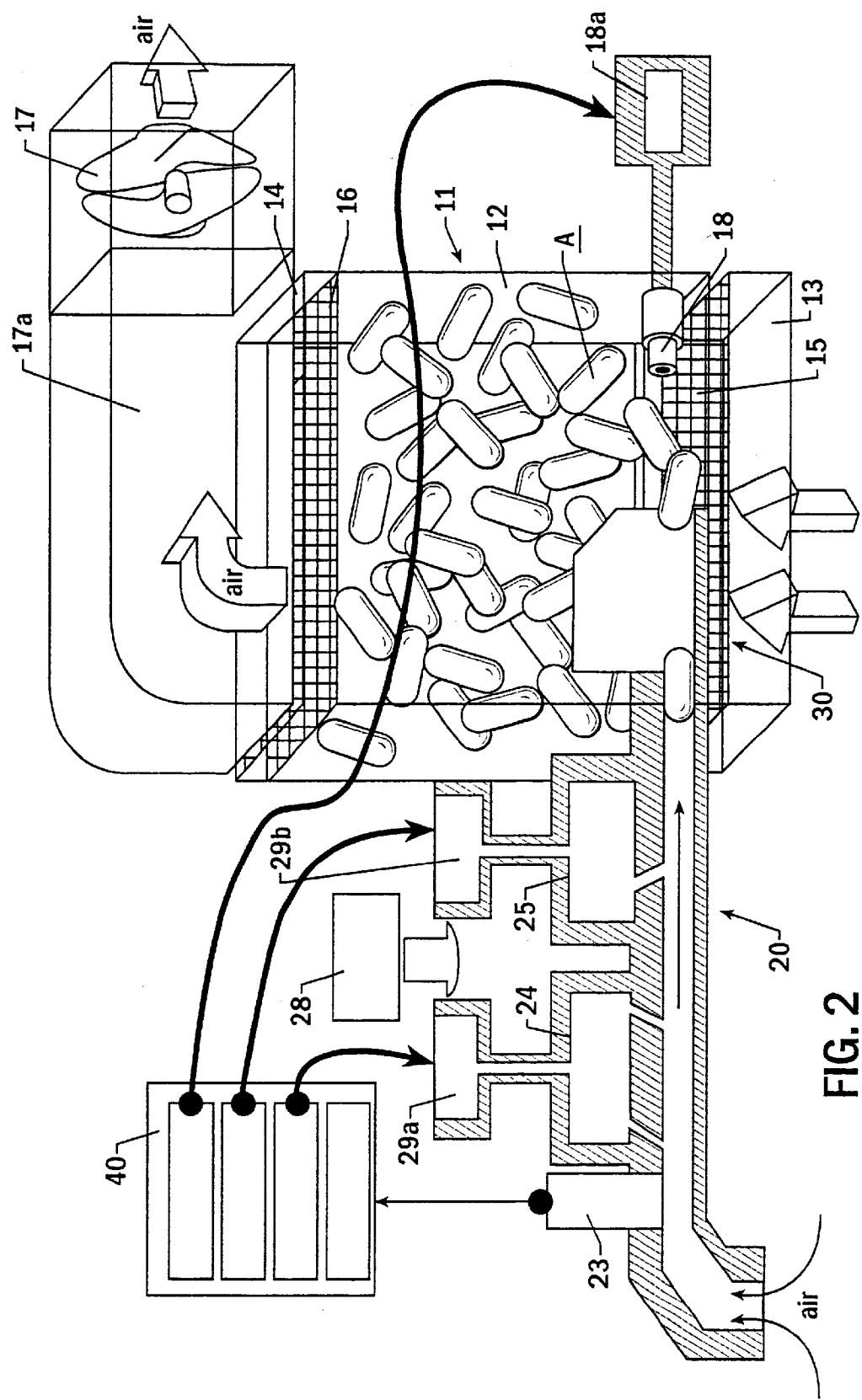
FIG. 2 is a schematic side view of the device of FIG. 1.

Referring now to the drawings, a singulating device, illustrated broadly at 10, is illustrated in FIGS. 1 and 2. The device 10 includes a bulk article housing 11 in which a plurality of small articles A are suspended in fluidized motion. The housing 11 includes a surrounding wall 12, a floor 13, and a ceiling 14. The wall 12 may be continuous or segmented (i.e., it may comprise multiple contiguous walls), may have a door 12a filling for access for articles A and is preferably transparent to allow visual access to the articles A contained therein. Similarly, the floor 13 and ceiling 14 may smoothly merge with the wall 12 or may form distinct corners therewith. Those skilled in this art will recognize that housings of many shapes and configurations may be suitable for use with the present invention.

In the illustrated embodiment, the floor 13 includes a screen 15 or other foraminous member that allows air passage into the housing 11 but not passage of the articles A out. Similarly, the ceiling 14 includes a screen 16 or other foraminous member that functions to keep articles A in, but allow air passage; in this instance the air flows out of the housing 11. A blower 17 or other device for inducing airflow is attached to a low pressure plenum 17a mounted above the screen 16. The blower 17 is included to create a negative pressure differential with respect to ambient air pressure by drawing air from outside the housing through the screen 15, into the cavity of the housing 11, and out through the screen 16.

The illustrated embodiment also includes a jet nozzle 18 or other jet aperture located on the wall 12. The jet nozzle 18 is oriented to direct a jet into the housing 11 toward an exit channel 20 located opposite the housing from the jet nozzle 18. Access to the nozzle 18 is controlled by a valve 18a, which is fluidly attached to a positive pressure source 28 (described in detail below).

Referring still to FIGS. 1 and 2, at the lower portion of the wall 12, the exit channel 20 extends away from the housing 11 opposite the jet nozzle 18. An article-orienting unit 30 is located at the mouth of the exit channel 20 to singulate articles A entering the exit channel 20. These components are described in detail hereinbelow.

Figure 3A:
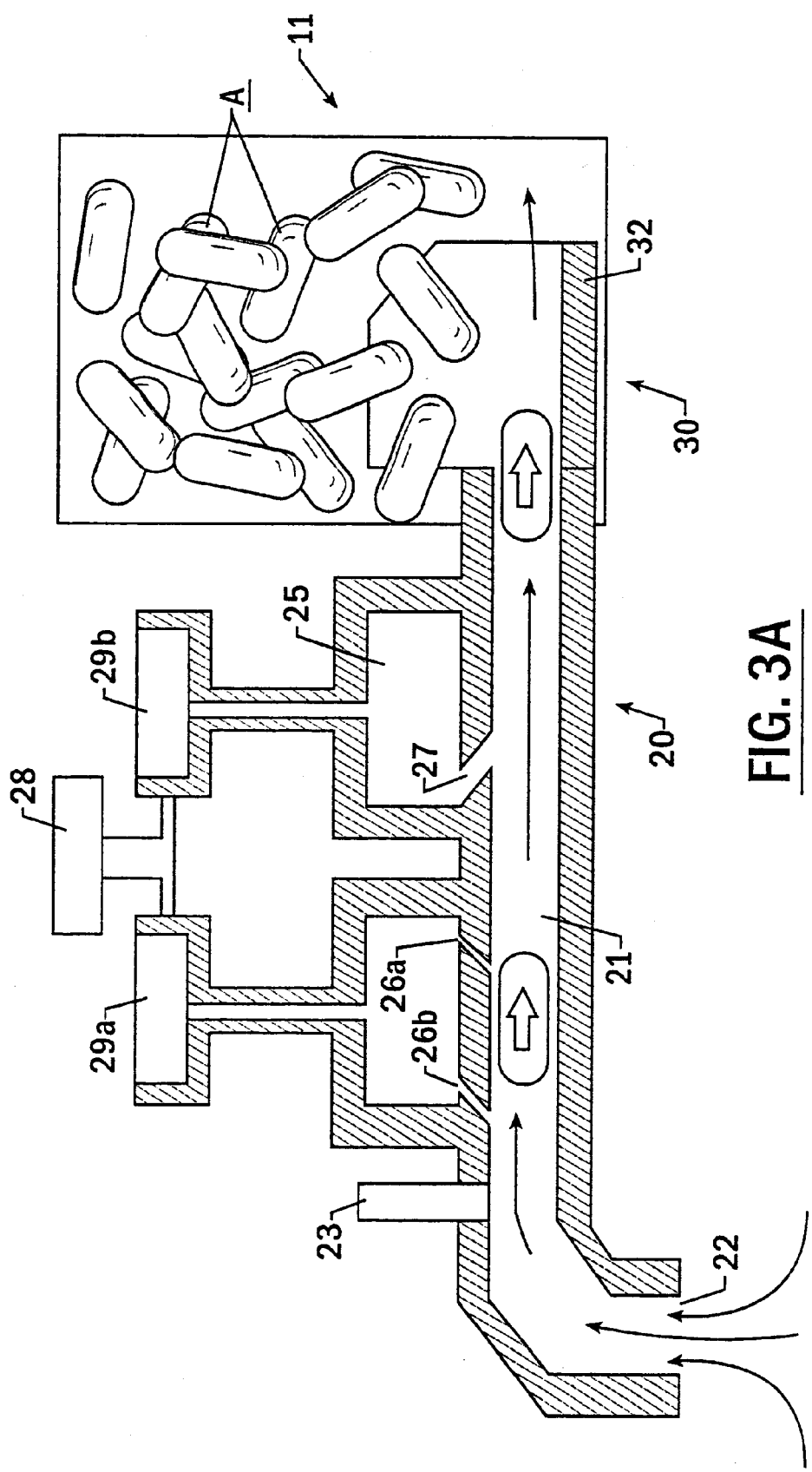
FIG. 3A is a side section view of the device of FIG. 1 showing both the forward jet valve and the rear jet valve closed.
Figure 3B:
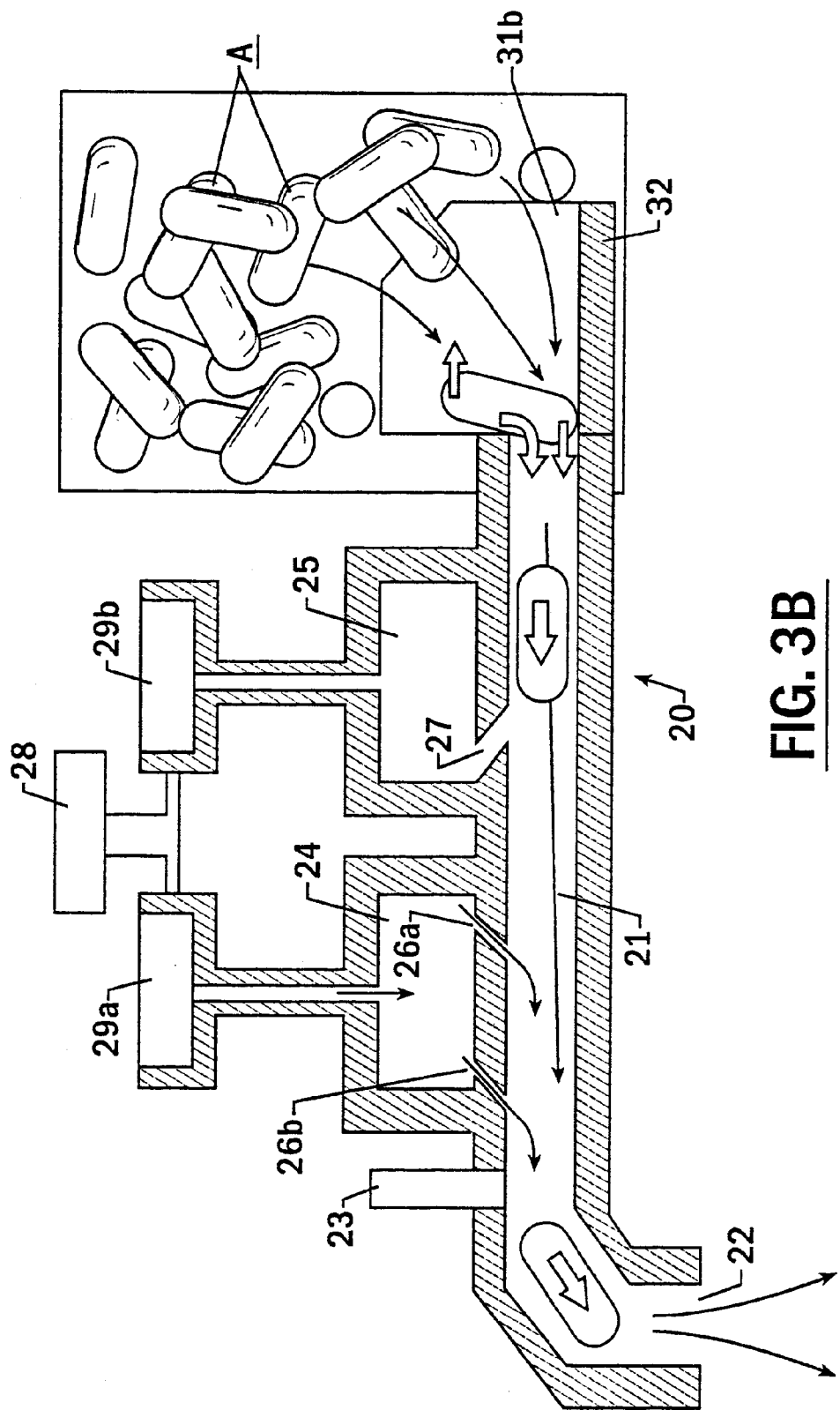
FIG. 3B is a side section view of the device of FIG. 1 showing the forward jet valve open and the rear jet valve closed.
Figure 3C:
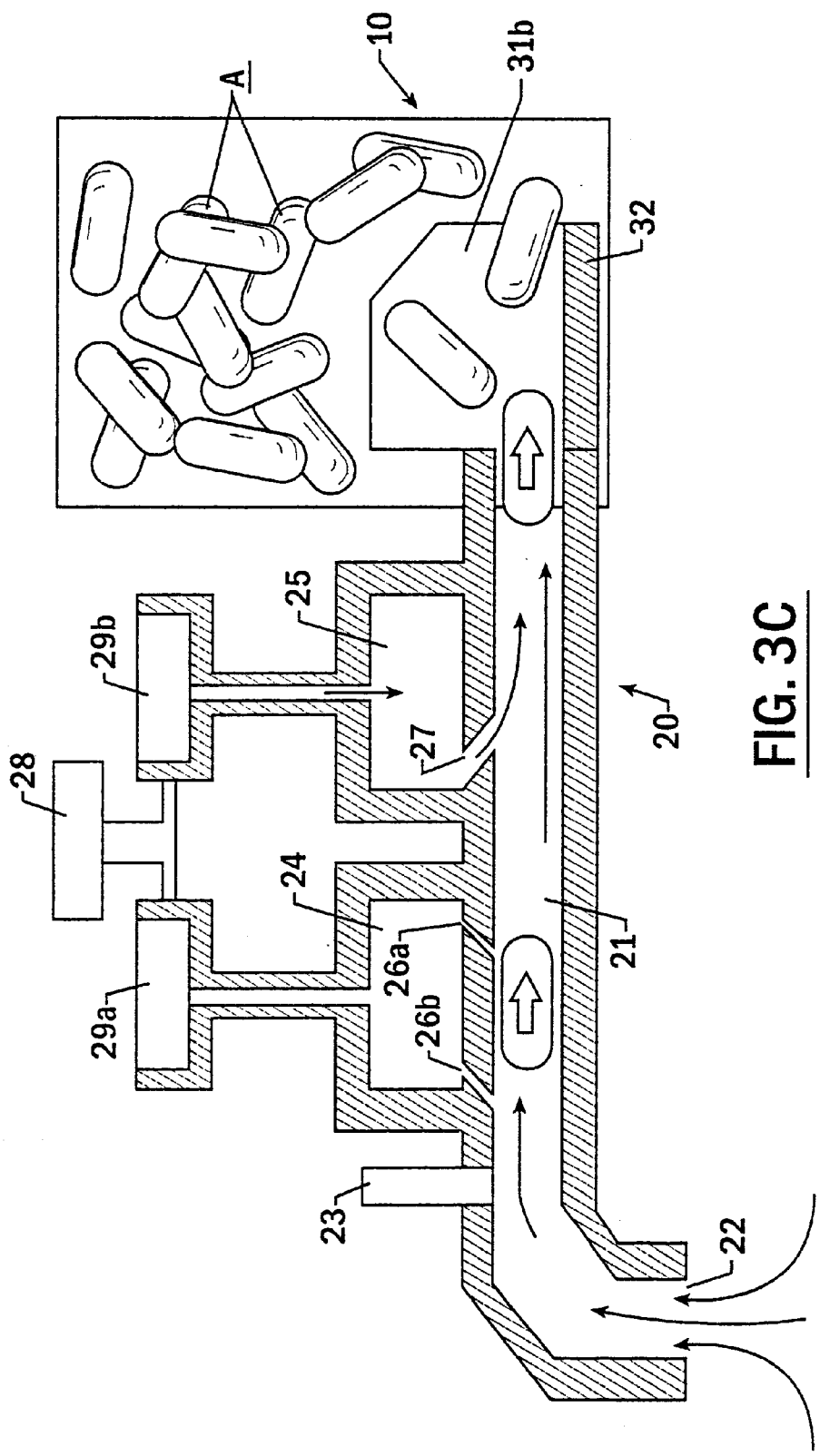
FIG. 3C is a side section view of the device of FIG. 1 showing the forward jet valve closed and the rear jet valve open.

Referring now to FIGS. 3A–3C, the exit channel 20 includes a primary lumen 21 that extends downstream from the article-orienting unit 30 to terminate at an outlet 22. The lumen 21 defines a downstream flow path P therein. As used herein, the term "downstream" means the direction that articles A travel in moving from the housing 11 to the outlet 22. Conversely, the term "upstream" means the direction opposite the downstream direction. It should be noted that, relative to an absolute x-y-z coordinate axis system, these directions may shift as articles A move in the exit channel 20 (for example, in the illustrated embodiment, the articles A move directly away from the housing 11, then turn downwardly). The "longitudinal" dimension of a structure or component is intended to be parallel with the downstream direction, and the "transverse" dimension of a structure or component is intended to be normal to the downstream direction.

In the illustrated embodiment, the lumen 21 has a cross-section that permits the passage of only one article at a time; i.e., two or more articles may not travel in the lumen 21 side-by-side. Preferably, the lumen has a cross-section that generally resembles, but is somewhat larger than, that of the transverse cross-section of an article A traveling in the lumen 21. For example, the lumen 21 of the channel 20 can be sized to be generally rectangular in cross section, with a height or width dimension slightly smaller than two minimum dimensions α of the articles A (see FIGS. 4A and 4C) to prevent the simultaneous passage of two articles A.

A forward jet pressure chamber 24 and a rear pressure jet chamber 25 are mounted to the exit channel 20. The forward jet pressure chamber 24 is in fluid communication with the lumen 21 via a pair of forward jet apertures 26a, 26b, each of which is oriented at an angle (preferably between about 1 and 89 degrees, and more preferably between 5 and 50 degrees) relative to the longitudinal axis of the lumen 21 such that a jet exiting the forward jet apertures 26a, 26b enhances flow in the lumen 21 toward the outlet 22. The rear pressure jet chamber 25 is in fluid communication with the lumen 21 via a rear jet aperture 27, which is oriented at an angle (preferably between about 1 and 89 degrees, and more preferably between 5 and 50 degrees) relative to the longitudinal axis of the lumen 21 such that a jet exiting the rear jet aperture 27 impedes flow in lumen 21 toward the outlet 22. In some embodiments, any or all of the forwardly and rearwardly-directed apertures may be arranged in combinations of any number.

A common pressure source 28 is attached to each of the forward and rear pressure jet chambers 24, 25 and, as noted above, the jet nozzle 18. The pressure is each chamber 24, 25, 18 is regulated by a respective valve 29a, 29b, 18a. Those skilled in this art will recognize that the pressure in each chamber 24, 25, 18, or in fact each jet aperture 26a, 26b, 27, 18, may be controlled by a separate pressure source. Thus, it is to be understood that when separate "first", "second", "third" or even "fourth" pressure sources are described, these pressure sources may be common (i.e., coincident) sources, or any or all of these may be separate sources.

An article sensor 23 is positioned near the outlet 22 and is configured to count passing articles A as they travel through the lumen 21. Exemplary sensors include an opposing LED/photo-transistor pair and reflective, capacitive, or mechanical switches. A controller 40 is operatively connected with the valves 29a, 29b, 18a and with the sensor 23. The controller 40 causes the valves 29a, 29b, 18a to open or close depending on the number of articles A that have been counted by the sensor 23 at any particular point in time. The controller 40 can be any number of controller units known to those skilled in this art as being suitable for receiving signals from the sensor 23 and transmitting operating signals to the valves 29a, 29b, 18a; an exemplary controller is the 87518-bit micro controller, available from Intel. It should be recognized that the controller 40 may be connected directly to the pressure source 28 (or any other pressure sources in embodiments in which multiple pressure sources are employed) to activate them directly rather than operating the valves.

Referring now to FIGS. 5A–5C, the article-orienting unit 30 has a pair of generally parallel, spaced panels 31a, 31b and a third panel 32 that is generally perpendicular to the panels 31a, 31b. The downstream ends of these panels 31a, 31b, 32 abut the mouth of the exit channel 20 and their upstream ends extend slightly upstream into the housing 11. One skilled in the art will recognize that the downstream ends of one or all of the aforementioned panels may extend most or all the entire length of the lumen 21, ensuring that only one article A at a time may pass therein. The panels 31a, 31b are spaced apart a distance a, and the panel 32 is spaced from an upstream portion 20a of the exit channel 20 a distance b, thereby defining an entry space E of the dimensions a×b for the articles A. The article-orienting unit 30 is particularly suited for the singulation of articles A that are oblong or oblate, with a longest longitudinal dimension $\beta$, a shortest transverse dimension $\alpha$, and an intermediate transverse dimension $\delta$ that is greater than $\alpha$ but less than or equal to $\beta$ (see FIGS. 4A–4C).

In one embodiment, the distance a is greater than a but less than the smaller of $\delta$ and two times $\alpha$. In this embodiment, the distance b is greater than $\delta$ but less than the smaller of $\beta$ and two times $\delta$. In this configuration, the articles A can fit in the entry space E in only one orientation (that shown in FIG. 5A, in which the dimension $\alpha$ is generally parallel to the distance a). In another embodiment, the distance a is greater than $\alpha$ and $\delta$, but is less than two times $\alpha$. In this second embodiment, the distance b is greater than $\delta$ but is less than the smaller of $\beta$ and two times $\alpha$. In this configuration, the article A can fit in the entry space E in any orientation in which $\beta$ is perpendicular to the distances a, b of the entry space E.

Those skilled in this art will recognize that other configurations for singulating articles may be suitable. The design and dimensions of an alternative article-orienting unit should be chosen to prevent more than one article A entering the exit channel 20 at once. Furthermore, objects whose three dimensions are substantially equal (i.e. spheres) will also pass through the orienting device achieving the desired singulation. Exemplary articles include comestibles such as candies and breath mints, machine components sucha as bolts, nuts and other fasteners, valuables such as diamonds and other gemstones, vitamins, and the like. It may also be understood that an article-orienting device may be attached at the outlet 22, with the result that the device 10 may singulate in both directions.

Figure 8:
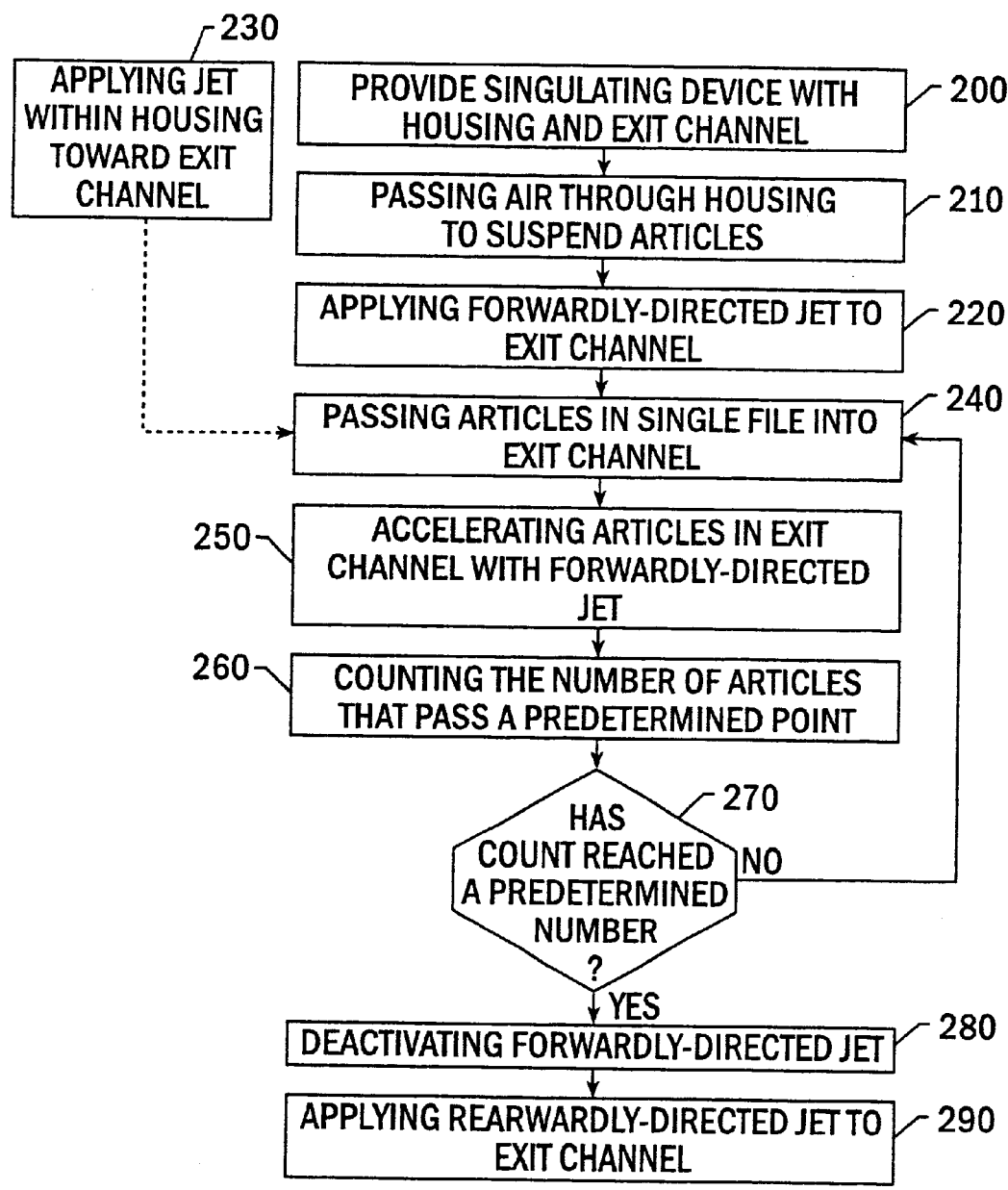
FIG. 8 is a flow chart illustrating a method of singulating articles according to the present invention.

In operation, the device 10 begins with the valves 29a, 29b of the forward and rear jet chambers 24, 25 closed (as directed by the controller 40), such that the pressure source 28 does not provide jets through the jet apertures 26a, 26b, 27 or through the jet aperture 18a (see FIG. 3A and Block 200 of FIG. 8). The blower 17 is activated and creates a low-level negative pressure with respect to ambient air pressure, causing ambient air to be drawn into the housing 11 through the bottom screen 15 and onto the articles A, thereby suspending (agitating or fluidizing) them.

The air then passes out through the top screen 16 and past the blower 17. This agitation gives the articles A fluid flow characteristics within the housing 11 (Block 210). The individual articles A travel randomly about the interior of the housing 11, or can be made to mimic specific fluid flow patterns if desired. In addition, airflow is established from the exterior of the device 10 backward through the exit channel 20, inward to the housing 11, and out the top screen 16 to the blower 17. This airflow pattern prevents articles A from spilling out of the housing 11 into the exit channel 20.

Those skilled in this art will recognize that other techniques for preparing articles for singulation may also be employed with the present invention. For example, articles in the housing may be mechanically agitated through known techniques.

When the controller 40 requests the dispensing and counting of articles, the controller 40 signals the forward jet chamber valve 29a to open, and a forwardly-directed air jet is generated through the forward jet apertures 26a, 26b (see FIG. 3B and Block 220 of FIG. 8). This activity creates a net outward flow of air from the housing 11 through the exit channel 20. Preferably, the jets apply a pressure of between about 1 and 500 pounds per square inch into the exit channel 20. One skilled in the art will recognize that a number of different variable pressure control methods may be used for a given pressure pulse through a jet, depending on the effect desired (for example to match the impedance of the object in the channel), including simple square waves, sawtooth, sinusoidal, or complex pressure waveforms. In addition, the controller 40 may signal the valve 18a to open so that the jet nozzle 18 emits a jet (preferably of about 1 to 500 psi) that urges articles toward and through the exit channel 20 (Block 230 of FIG. 8). In the case where 26 and 27 are only used a vacuum is induced at the entry space E, with the result that articles A within the influence of this induced airflow are drawn to the article-orienting unit 30. In the case where only the jet nozzle 18 is used, the high-speed air impinging on the object propels it towards and through the exit channel. Of course one skilled in the art will realize that jets 26 and 18 may be used in concert.

As the articles A are drawn to the entry space E at the entrance to the exit channel 20, their orientation determines whether they are able to travel through the article-orienting unit 30. If an article A is oriented generally parallel to the air flow path with its shortest dimension $\alpha$ generally parallel with dimension a of the entry space E (see FIG. 5A), it is able to fit between the panels 31a, 31b, the panel 32 and the channel wall 20a and is, therefore, free to travel into the exit channel 20. If an article A is oriented perpendicular to the air flow path and generally parallel to panel 32 (see FIG. 5B), it strikes the upstream ends of the panels 31a, 31b (and therefore cannot enter the exit channel 20) and rebounds back into the housing 11 to be further agitated. If an article A is oriented perpendicular to the air flow path and parallel to the panels 31a, 31b (see FIG. 5C), one end of the article A can strike either the panel 32 or the wall 20a of the exit channel 20 (as is illustrated in FIG. 5C). Contact with the panel 32 or of the wall 20a causes the article A to rotate about 90 degrees to a position parallel to the air flow path, thereby automatically orienting the article A such that it is free to enter the exit channel 20.

Notably, the article-orienting unit 30 is sized and configured so that only one article A can pass through the article-orienting unit 30 at a time. Consequently, articles A enter the exit channel as an endwise (or edgewise), single-file stream.

Referring now to FIG. 3B, once an article A passes into the exit channel 20 (Block 240 of FIG. 8), the air flow velocity induced by the jet exiting the forward jet aperture 26a increases and thus the article A tends to accelerate with that airflow (Block 250 of FIG. 8). Further along the exit channel 20, the article A encounters that jet directly and so achieves a higher acceleration. Still further downstream in the exit channel 20, the article A encounters the second jet exiting the forward jet aperture 26b and experiences even higher acceleration. Through each of these stages, the interval between successive articles A is increased. Those skilled in the art will recognize that operating with only one forward jet may achieve adequate results.

As the articles A continue through the exit channel 20, they pass the sensor 23, where the articles A are detected and counted (Block 260 of FIG. 8). The increased interval created by the multiple acceleration stages encourages accurate counting of the articles A. Also, the inability of the exit channel 20 to permit the passage of more than one article A at a time at any single point in the exit channel 20 (i.e., the articles A cannot pass "side-by-side" through the exit channel 20) also assists the sensor 23 in distinguishing one article A from the next. The sensor 23 signals the controller 40 with the passage of each article A so that the controller 40 can count the number of articles A that have passed thereby and compare that number to a predetermined number (Block 270 of FIG. 8). Those skilled in this art will recognize that, although it is preferred that the sensor 23 be positioned downstream of the forwardly-directed jet apertures 26a, 26b, other locations for the sensor 23 on the exit channel 20 may also be suitable for use with the present invention, and that more than one sensor may be used.

After the articles A have passed the outlet 22, they eventually reach a point that they are no longer under the influence of the jet flows or low-pressure flow. They are then free to travel to a receiving container (not shown).

The process described above continues until the controller 40 determines that a predetermined number of articles has passed the sensor 23, at which point the controller 40 signals the valve 29a to close, which deactivates the forward jets (Block 280 of FIG. 8), and signals the valve 29b to open to generate a reverse jet from the rear jet aperture 27 (see FIG. 3C and Block 290 of FIG. 8). The controller 40 also signals the valve 18a if present to close in order to cease the production of the jet from the nozzle 18. The momentum of the articles A that have passed the sensor 23 propels them out of the exit channel 20 and into the receiving container. Articles A that have not yet reached the sensor 23, however, reverse direction due to the reverse flow created by both the reverse jet and the sub-ambient pressure generated by the blower 17. Consequently, they return to the housing 11 through the article-orienting unit 30 (aided by the fact that the cross-section of the lumen 21 of the exit channel 20 prevents the articles A from re-orienting). This reversal of direction of the articles A is also assisted by the interval created by the multiple acceleration stages described earlier. In some embodiments, the housing 11 may even be filled with articles A through the outlet 22 via the suction provided by the blower 17 and the rearward jet 27.

Another aspect of this invention is that it some instances it may operate adequately without the orienting device. In this case, the controller 40 may be used to detect jams at the entrance to the exit channel (by dint of the lack of passage signals at sensor 23) and so the forward and reverse jets may be pulsed off and on to clear the jam. Typically, this is will reduce the overall speed of the system but that may be an acceptable trade in certain applications.

Those skilled in this art will recognize that other designs for components of the device 10 may be suitable for use with the present invention. For example, the article-orienting unit 30' may take the configuration of that illustrated in FIGS. 7A and 7B, which lacks a plate 32. Also suitable is the configuration of an article-orienting unit 100 shown in FIGS. 6A and 6B. The article-orienting unit 100 includes a pair of hinged panels 110 that pivot about a pivot axis 111 that is parallel with the flow axis of the exit channel 20. The hinged panels 110 and the wall 20a of the exit channel 20 define an entry space E' that is generally wedge-shaped and that can, depending on the shape of the article A only permit a single article A to pass therethrough at a time, and to do so in a preferred orientation. One skilled in the art will recognize that the downstream ends of the panels 110 may extend most or all the entire length of the lumen 21. One advantage of this configuration is the capability of one or both of the panels 110 to pivot relative to one another to adjust the size of the entry space available to the article A, thereby enabling the device 100 to be used on batches of articles that vary in size from batch to batch.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A device for singulating articles from a bulk supply of such articles, comprising:

a housing for holding articles to be singulated;

an exit channel fluidly connected to the housing and configured in cross-section to permit the passage of a single article at a time, the exit channel including a forwardly-directed jet aperture and a rearwardly directed jet aperture being located upstream of the forwardly directed aperture;

a first positive pressure source fluidly connected to the forwardly-directed jet;

a second positive pressure source fluidly connected to the rearwardly-directed jet; and a controller operatively connected with the first and second positive pressure sources that selectively controls the application of positive pressure to the forwardly-directed jet apertures.

2. The device defined in claim 1, further comprising a sensor operatively associated with the controller that detects articles passing through the exit channel.

3. The device defined in claim 1, further comprising a second forwardly-directed jet aperture located downstream of the rearwardly-directed aperture, the forwardly-directed aperture being fluidly connected with a third positive pressure source and with the controller.

4. The device defined in claim 3, wherein the first, second and third positive pressure sources are coincident.

5. The device defined in claim 1, wherein the first and second positive pressure sources are coincident.

6. The device defined in claim 1, wherein the housing includes a jet aperture directed toward the exit channel, the jet being fluidly connected to a fourth positive pressure source, the fourth positive pressure source being operatively connected to the controller.

7. The device defined in claim 1, wherein the housing includes a floor and an opposing ceiling, and wherein the floor includes a first foraminous member and the ceiling includes a second foraminous member.

8. The device defined in claim 1, further comprising an article-orienting member positioned upstream of the exit channel.

9. The device defined in claim 1, wherein said first positive pressure source and said forwardly-directed jet aperture are configured to direct a jet of between about 1 and 500 psi into the exit channel.

10. The device defined in claim 1, wherein said second positive pressure source and said rearwardly-directed jet aperture are configured to direct a jet of between about 1 and 500 psi into the exit channel.

11. The device defined in claim 6, wherein the housing jet aperture and the fourth positive pressure source are configured to directed a jet of between about 1 and 500 psi toward the exit channel.

12. The device defined in claim 1, further comprising a plurality of substantially identical articles to be singulated, the articles being stored in the housing.

13. An article-orienting singulating device, comprising:
a housing;
an exit channel attached to and fluidly connected with the housing;
an article-orienting unit that includes a pair of panels, each of which includes an upstream end and a downstream end, positioned with their downstream ends adjacent an upstream portion of the exit channel; and
wherein the pair of panels and the exit channel upstream portion define an entry space that permits an oblong article to enter only in a longitudinal orientation in which the longest dimension thereof is generally parallel to a downstream flow path; and
wherein the pair of panels and the exit channel upstream portion are spaced such that an oblong article that enters the entry space in a transverse orientation in which its longest dimension is generally perpendicular to the downstream flow path and that strikes the exit channel upstream portion is caused to re-orient itself to a longitudinal orientation and pass into the exit channel.

14. The article-orienting singulating device defined in claim 13, wherein the panels are generally parallel with each other.

15. The article-orienting singulating device defined in claim 14, further comprising a third panel extending between the panels upstream of the exit channel.

16. The article-orienting singulating device defined in claim 13, wherein the panels are pivotally attached to each other such that pivotal movement of the panels relative to one another varies the configuration of the entry space.

17. The article-orienting singulating device defined in claim 13, further comprising a plurality of substantially identical articles to be singulated, the articles being stored in the housing.

18. The article-orienting singulating device defined in claim 17, wherein the articles are generally oblong and have a longitudinal dimension, a first transverse dimension and a second transverse dimension that is less than the longitudinal dimension and greater than the first transverse dimension, and wherein the entry space is defined by a first distance and a second distance larger than and perpendicular to the first distance, and wherein the first distance is greater than the first transverse dimension and less than the smaller of the second transverse dimension and two times the first transverse dimension, and the second distance is greater than the second transverse dimension and less than the smaller of the longitudinal dimension and two times the second transverse dimension, such that articles may pass into the exit channel through the article-orienting unit one at a time in a longitudinal orientation in which the first transverse dimension is generally parallel with the first distance, and the second transverse dimension is generally parallel with the second distance.

19. The article-orienting singulating device defined in claim 17, wherein the articles are generally oblong and have a longitudinal dimension, a first transverse dimension and a second transverse dimension that is less than the longitudinal dimension and greater than the first transverse dimension, and wherein the entry space is defined by a first distance and a second distance larger than and perpendicular to the first distance, and wherein the first distance is greater than the second transverse dimension and less than the smaller of the longitudinal dimension and two times the first transverse dimension, and the second distance is greater than the second transverse dimension and less than the smaller of the longitudinal dimension and two times the first transverse dimension, such that articles may pass through the article-orienting device into the exit channel one at a time in multiple longitudinal orientations.

20. The article-orienting singulating device defined in claim 17, wherein the exit channel is sized and configured such that only one article can pass through any cross-section thereof at a time.

21. A method of singulating items of substantially identical size and configuration from a bulk of such items stored in a housing, comprising the steps of:
providing a singulating device comprising a housing and an exit channel fluidly connected thereto, the exit channel defining a flow path;
applying a forwardly-directed jet into the exit channel;
passing a series of articles in single file into the exit channel;
accelerating articles in the exit channel with the forwardly-directed jet;
counting the number of articles that pass a predetermined point in the exit channel;
comparing the number of articles that have passed the predetermined point with a predetermined number; and
applying a rearwardly-directed jet into the exit channel after a predetermined number of articles have passed the predetermined point to draw any additional articles in the exit channel back into the housing.

22. The method defined in claim 21, further comprising the step of applying a jet within the housing toward the exit chamber to encourage the travel of articles toward the exit chamber.

23. The method defined in claim 21, further comprising the step of deactivating the forwardly-directed jet when the predetermined number of articles is reached.

24. The method defined in claim 21, further comprising the step of passing air through the housing to suspend the articles stored therein prior to the passing step.

25. The method defined in claim 21, further comprising the steps of pulsing at least one of the forwardly-directed jet and the rearwardly-directed jet to clear a jam in the exit channel.

26. A device for singulating articles from a bulk supply of such articles, comprising:
  a housing for holding articles to be singulated;
  an exit channel fluidly connected to the housing and configured in cross-section to permit the passage of a single article at a time;
  a jet aperture positioned in the housing and directed toward the exit channel;
  a positive pressure source fluidly connected to the jet aperture; and
  a controller operatively connected to the positive pressure source that selectively controls the application of positive pressure to the jet aperture;
  wherein the housing includes a floor and an opposing ceiling, and wherein the floor includes a first foraminous member and the ceiling includes a second foraminous member, and further comprising an air flow source that draws air into the housing through the first foraminous member and out of the housing through the second foraminous member.

27. The device defined in claim 26, further comprising a plurality of substantially identical articles to be singulated, wherein application of the air flow source causes the articles to be suspended within the housing.

28. The article-orienting singulating device defined in claim 27, wherein the articles are generally oblong and have a longitudinal dimension, a first transverse dimension and a second transverse dimension that is less than the longitudinal dimension and greater than the first transverse dimension, and wherein an entry space of the exit channel is defined by a first distance and a second distance larger than and perpendicular to the first distance, and wherein the first distance is greater than the first transverse dimension and less than the smaller of the second transverse dimension and two times the first transverse dimension, and the second distance is greater than the second transverse dimension and less than the smaller of the longitudinal dimension and two times the second transverse dimension, such that articles may pass into the exit channel through the article-orienting unit one at a time in a longitudinal orientation in which the first transverse dimension is generally parallel with the first distance, and the second transverse dimension is generally parallel with the second distance.

29. The article-orienting singulating device defined in claim 27, wherein the articles are generally oblong and have a longitudinal dimension, a first transverse dimension and a second transverse dimension that is less than the longitudinal dimension and greater than the first transverse dimension, and wherein an entry space of the exit channel is defined by a first distance and a second distance larger than and perpendicular to the first distance, and wherein the first distance is greater than the second transverse dimension and less than the smaller of the longitudinal dimension and two times the first transverse dimension, and the second distance is greater than the second transverse dimension and less than the smaller of the longitudinal dimension and two times the first transverse dimension, such that articles may pass through the article-orienting device into the exit channel one at a time in multiple longitudinal orientations.

* * * * *

UNITED STATES PATENT AND TRADEMARK OFFICE
CERTIFICATE OF CORRECTION

PATENT NO.     : 6,631,826 B2
DATED          : October 14, 2003
INVENTOR(S)    : Pollard et al.

It is certified that error appears in the above-identified patent and that said Letters Patent is hereby corrected as shown below:

<u>Column 10,</u>
Line 47, should read -- accelerating articles in single file into the exit channel with the --.

Signed and Sealed this

Thirteenth Day of April, 2004

JON W. DUDAS
*Acting Director of the United States Patent and Trademark Office*